(12) United States Patent
Ota et al.

(10) Patent No.: US 11,431,516 B2
(45) Date of Patent: Aug. 30, 2022

(54) NETWORK SYSTEM WITH TWO INDEPENDENT AND REDUNDANT POWER SUPPLY SYSTEMS

(71) Applicants: TOYOTA JIDOSHA KABUSHIKI KAISHA, Toyota (JP); MAZDA MOTOR CORPORATION, Hiroshima (JP)

(72) Inventors: Naofumi Ota, Toyota (JP); Jiro Ito, Toyota (JP); Ryota Misumi, Toyota (JP); Kazuichi Fujisaka, Hiroshima (JP); Sadahisa Yamada, Hiroshima (JP)

(73) Assignees: TOYOTA JIDOSHA KABUSHIKI KAISHA, Toyota (JP); MAZDA MOTOR CORPORATION, Hiroshima (JP)

( * ) Notice: Subject to any disclaimer, the term of this patent is extended or adjusted under 35 U.S.C. 154(b) by 67 days.

(21) Appl. No.: 16/995,968

(22) Filed: Aug. 18, 2020

(65) Prior Publication Data

US 2021/0067356 A1 Mar. 4, 2021

(30) Foreign Application Priority Data

Aug. 30, 2019 (JP) .............................. JP2019-157920

(51) Int. Cl.
*G06F 1/00* (2006.01)
*H04L 12/10* (2006.01)
(Continued)

(52) U.S. Cl.
CPC .............. *H04L 12/10* (2013.01); *G06F 1/266* (2013.01); *G06F 1/3203* (2013.01); *H02J 1/14* (2013.01); *H02J 9/06* (2013.01)

(58) Field of Classification Search
CPC .............. H04L 12/10; H04L 12/40176; H04L 2012/40273; G06F 1/266; G06F 1/3203;
(Continued)

(56) References Cited

U.S. PATENT DOCUMENTS

2020/0017115 A1 1/2020 Higashitani et al.

FOREIGN PATENT DOCUMENTS

| CN | 109606192 A | 4/2019 |
| CN | 109693625 A | 4/2019 |

(Continued)

OTHER PUBLICATIONS

English Translation of CN109606192 (Year: 2019).*
Feb. 2, 2021 Search Report issued in European Patent Application No. 20191903.2.

*Primary Examiner* — Xuxing Chen
(74) *Attorney, Agent, or Firm* — Oliff PLC

(57) ABSTRACT

A network system includes: an electric power system including a first power supply system and a second power supply system; a higher-level device connected to a first power supply of the first power supply system and a second power supply of the second power supply system; a first intermediate device connected to the first power supply of the first power supply system and configured to control supply of an electric power to a first lower-level device; and a second intermediate device connected to the second power supply of the second power supply system and configured to control supply of an electric power to a second lower-level device that is a redundant component for the first lower-level device.

2 Claims, 4 Drawing Sheets

(51) Int. Cl.
*G06F 1/26* (2006.01)
*G06F 1/3203* (2019.01)
*H02J 1/14* (2006.01)
*H02J 9/06* (2006.01)

(58) Field of Classification Search
CPC ........... H02J 1/14; H02J 9/06; B60R 16/0231; B60R 16/03
See application file for complete search history.

(56) References Cited

FOREIGN PATENT DOCUMENTS

| | | |
|---|---|---|
| JP | 2015-067187 A | 4/2015 |
| JP | 2019-189021 A | 10/2019 |
| WO | 2018/193709 A1 | 10/2018 |

* cited by examiner

NETWORK SYSTEM WITH TWO INDEPENDENT AND REDUNDANT POWER SUPPLY SYSTEMS

INCORPORATION BY REFERENCE

The disclosure of Japanese Patent Application No. 2019-157920 filed on Aug. 30, 2019 including the specification, drawings and abstract is incorporated herein by reference in its entirety.

BACKGROUND

1. Technical Field

The invention relates to a network system installed in a vehicle, or the like.

2. Description of Related Art

Multiple devices, such as electronic devices called electronic control units (ECUs) and electrical components, are installed in a vehicle. These devices share and execute various functions of a vehicle.

As a network system including multiple devices, Japanese Unexamined Patent Application Publication No. 2015-067187 (JP 2015-067187 A) describes a network system in a tree topology. In the network system described in JP 2015-067187 A, a plurality of relay ECUs that are higher-level nodes is connected to one another by communication lines, and a plurality of lower-level devices that are lower-level nodes is connected to each of the relay ECUs.

SUMMARY

In such a network system as described in JP 2015-067187 A, it is conceivable that higher-level nodes are advanced devices that have intensive functions for vehicle control and lower-level nodes are simplified devices that are controlled from an associated one of the higher-level nodes. It is also conceivable that an intermediate node having a gateway function is further provided between each higher-level node and the associated lower-level nodes.

In recent years, from the viewpoint of introduction of fail operation to vehicles, power supply redundancy is required in network systems configured as described above. To such a request, the number of lower-level devices that need redundancy to implement fail operation has been small so far. Therefore, for example, when the network system described in JP 2015-067187 A is provided with redundant power supplies, it is enough to connect each redundant power supply line to each lower-level device that requires redundancy with an individual wire and supply each lower-level device with an electric power.

However, when the number of lower-level devices for autonomous driving function, or the like, which require redundancy, further increases, wires are complex when an electric power is directly supplied from each power supply line to the associated lower-level device through an individual wire as in the case before. Therefore, there is room for studying a redundant power supply configuration for supplying an electric power to each lower-level device without a complex configuration.

The invention provides a network system that is able to provide a redundant power supply configuration without a complex configuration even when the number of devices that require redundancy increases.

A first aspect of the invention is a network system. The network system includes an electric power system including a first power supply system and a second power supply system as redundant systems, a higher-level device connected to a first power supply of the first power supply system and a second power supply of the second power supply system, a first intermediate device, and a second intermediate device. The first intermediate device is connected to the higher-level device so as to communicate with the higher-level device. The first intermediate device is connected to the first power supply of the first power supply system. The first intermediate device is configured to control supply of an electric power to a first lower-level device. The second intermediate device is connected to the higher-level device so as to communicate with the higher-level device. The second intermediate device is connected to the second power supply of the second power supply system. The second intermediate device is configured to control supply of an electric power to a second lower-level device that is a redundant component for the first lower-level device.

In the first aspect, the first intermediate device may be configured to supply an electric power to a plurality of third lower-level devices including the first lower-level device via a first device configured to execute interruption control. The second intermediate device may be configured to supply an electric power to a plurality of fourth lower-level devices including the second lower-level device via a second device configured to execute interruption control. The higher-level device may be configured to, when the first power supply system fails, stop supply of an electric power to at least one of the plurality of fourth lower-level devices by controlling the second device, and configured to, when the second power supply system fails, stop supply of an electric power to at least one of the plurality of third lower-level devices by controlling the first device. The at least one of the fourth lower-level devices may be unnecessary to operate. The at least one of the third lower-level devices may be unnecessary to operate.

According to the first aspect of the invention, a redundant power supply configuration is provided without a complex configuration even when the number of devices that require redundancy increases.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

In an embodiment of the invention, a network system includes two communication systems that are supplied with an electric power from different power supply systems. The network system includes two lower-level devices each having an equivalent function. These lower-level devices communicate with a higher-level device through the different communication systems. With this configuration, redundancy can be appropriately imparted to the network system, and the network system is able to execute fail operation against a failure of one of the power supply systems.

Embodiment

Hereinafter, an embodiment of the invention will be described in detail with reference to the accompanying drawings.

Configuration

Figure 1:
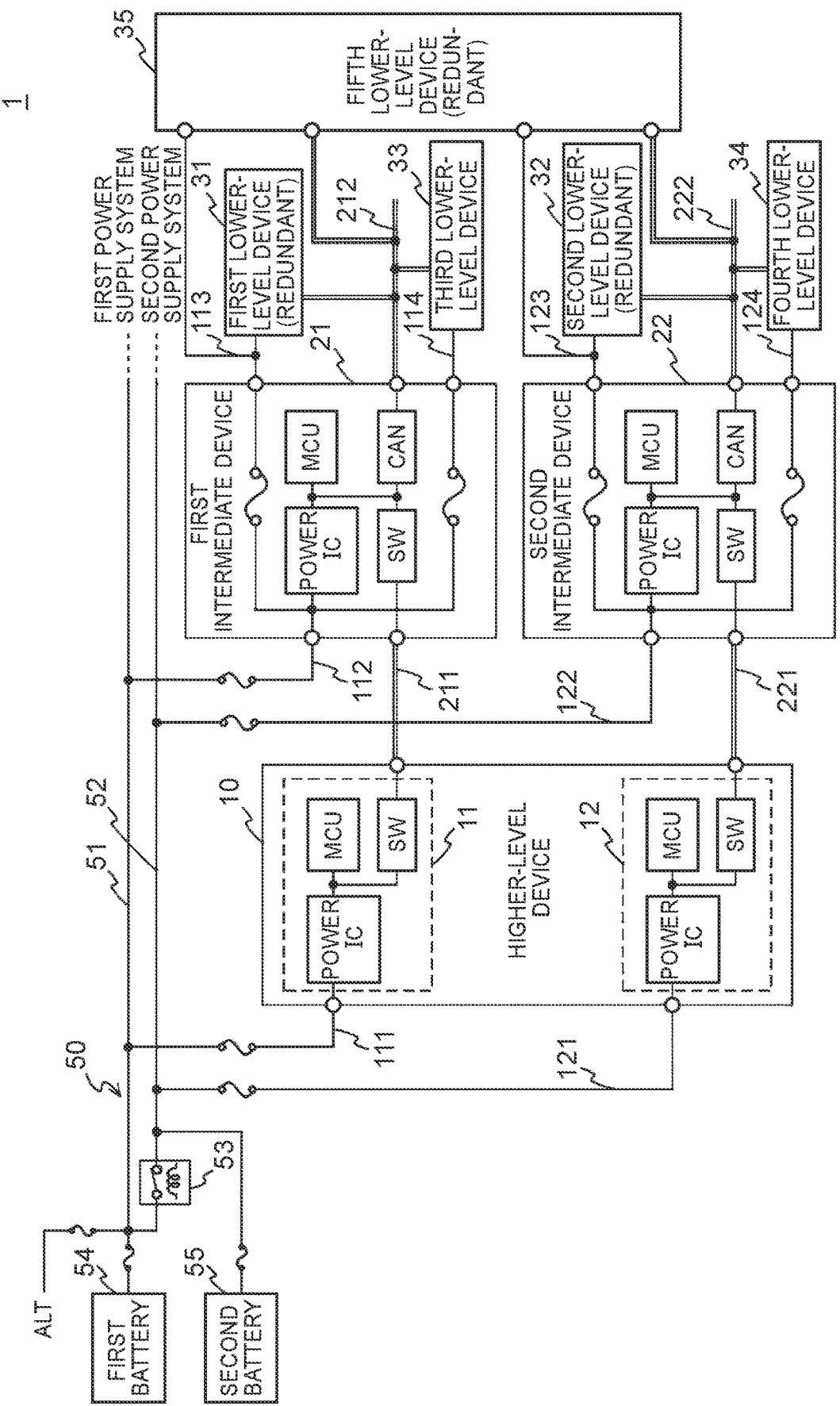
FIG. 1 is a schematic diagram of a network system according to an embodiment of the invention.

FIG. 1 is a schematic diagram of a network system 1 according to the present embodiment. The network system 1 may be installed in a hybrid vehicle (HV), an electric vehicle (EV), or the like.

The network system 1 according to the present embodiment includes an electric power system 50. The electric power system 50 includes a first power supply system 51 and a second power supply system 52 as redundant systems. The first power supply system 51 is supplied with an electric power from a first battery 54 serving as a power supply. The second power supply system 52 is supplied with an electric power from a second battery 55 serving as a power supply. A secondary battery, such as a chargeable and dischargeable lithium ion battery, is used as each of the first battery 54 and the second battery 55. An alternator (ALT) or another battery may be connected to the first battery 54 via a DC-DC converter (not shown). A relay 53 (such as a mechanical relay and a semiconductor relay) is inserted between the first power supply system 51 (first battery 54) and the second power supply system 52 (second battery 55). The relay 53 is able to conduct during normal times when there is no abnormality in each power supply system and interrupt when there is an abnormality, such as a failure of one of the power supply systems.

The network system 1 according to the embodiment includes a higher-level node, an intermediate node, and lower-level nodes. An example of the higher-level node is a comparatively advanced ECU that intensively executes operations for various vehicle control functions. An example of the lower-level nodes is an ECU having a comparatively specialized function to individually control a sensor, an actuator, or both. An example of the intermediate node is an ECU that functions as a gateway that relays communication between the higher-level node and the lower-level nodes.

The network system 1 includes a higher-level device 10 as the higher-level node. Under the higher-level device 10, at least one intermediate device that is at least one intermediate node is connected in, for example, a tree topology. In other words, in the example shown in FIG. 1, a first intermediate device 21 and a second intermediate device 22 each are connected to the higher-level device 10.

The higher-level device 10 has a communication function of a first communication channel and a second communication channel. The higher-level device 10 includes a first channel communication unit 11 and a second channel communication unit 12. The first channel communication unit 11 performs first communication channel communication. The second channel communication unit 12 performs second communication channel communication. The first channel communication unit 11 and the second channel communication unit 12 each include, for example, a power IC, a micro controller unit (MCU), an Ethernet (registered trademark) switch (SW), and the like.

The higher-level device 10 is connected to the first power supply system 51 by a power supply line 111 and is connected to the second power supply system 52 by a power supply line 121. The higher-level device 10 activates the first channel communication unit 11 with an electric power that is supplied from the first power supply system 51 via the power supply line 111, executes a predetermined first communication channel process, and outputs the result to the first intermediate device 21 via a communication line 211. The higher-level device 10 activates the second channel communication unit 12 with an electric power that is supplied from the second power supply system 52 via the power supply line 121, executes a predetermined second communication channel process, and outputs the result to the second intermediate device 22 via a communication line 221.

Under each of the first intermediate device 21 and the second intermediate device 22, at least one lower-level device that is at least one lower-level node is connected. In other words, in the example shown in FIG. 1, a first lower-level device 31, a third lower-level device 33, and a fifth lower-level device 35 are connected to the first intermediate device 21, and a second lower-level device 32, a fourth lower-level device 34, and a fifth lower-level device 35 are connected to the second intermediate device 22.

Each of the first intermediate device 21 and the second intermediate device 22 functions as a gateway that relays communication and supply of an electric power between the higher-level device 10 and the associated lower-level devices, and includes, for example, a power IC, a micro controller unit (MCU), an Ethernet switch (SW), a controller area network transceiver (CAN transceiver), and the like.

The first intermediate device 21 is connected to the first power supply system 51 by a power supply line 112. The first intermediate device 21 supplies an electric power, which is supplied from the first power supply system 51 via the power supply line 112, to the first lower-level device 31 and the fifth lower-level device 35 via a power supply line 113 and to the third lower-level device 33 via a power supply line 114. The first intermediate device 21 executes the predetermined first communication channel process with the electric power that is supplied from the first power supply system 51 via the power supply line 112 and outputs the result to the first lower-level device 31, the third lower-level device 33, and the fifth lower-level device 35 via a communication line 212.

The second intermediate device 22 is connected to the second power supply system 52 by a power supply line 122. The second intermediate device 22 supplies an electric power, which is supplied from the second power supply system 52 via the power supply line 122, to the second lower-level device 32 and the fifth lower-level device 35 via a power supply line 123 and to the fourth lower-level device 34 via a power supply line 124. The second intermediate device 22 executes the predetermined second communication channel process with the electric power that is supplied from the second power supply system 52 via the power supply line 122 and outputs the result to the second lower-level device 32, the fourth lower-level device 34, and the fifth lower-level device 35 via a communication line 222.

An example of each of the lower-level devices 31, 32, 33, 34, 35 is an ECU having a comparatively specialized function to individually control a sensor, an actuator, or both. In the present embodiment, the first lower-level device 31 and the second lower-level device 32 are devices for implementing a function that is required for fail operation in the event of an abnormality, or the like, and have a redundant relationship with each other. The redundant relationship may be a relationship in which two components having exactly the same function as in the case of an electric power steering (EPS), an electric brake (EBS), or the like, are physically provided or a relationship in which counterpart functions can be replaced as in the case of a radio detection and ranging (Radar) sensor and a laser imaging detection and ranging (Lidar) sensor. The fifth lower-level device 35 has redundancy in a single component and is configured to be able to operate with not only an electric power that is supplied from the first power supply system 51 but also an electric power that is supplied from the second power supply system 52.

Each of the above-described devices includes a control unit and a memory, typically, a processor or a microcomputer; however, the lower-level devices may include the one including a sensor or an actuator and the one that does not include a control unit or a memory.

The higher-level device 10 and the first intermediate device 21 may be connected via at least one other intermediate device; however, the at least one other intermediate device each is configured to be supplied with an electric power from the first power supply system 51. The higher-level device 10 and the second intermediate device 22 may be connected via at least one other intermediate device; however, the at least one other intermediate device each is configured to be supplied with an electric power from the second power supply system 52.

The first lower-level device 31 and the third lower-level device 33 may be supplied with an electric power from not the first intermediate device 21. The first lower-level device 31 and the third lower-level device 33 may be supplied with an electric power directly from the first power supply system 51. The second lower-level device 32 and the fourth lower-level device 34 may be supplied with an electric power from not the second intermediate device 22. The second lower-level device 32 and the fourth lower-level device 34 may be supplied with an electric power directly from the second power supply system 52. The fifth lower-level device 35 may be supplied with an electric power from not the first intermediate device 21 or the second intermediate device 22. The fifth lower-level device 35 may be supplied with an electric power directly from one or both of the first power supply system 51 and the second power supply system 52.

State

Figure 2:
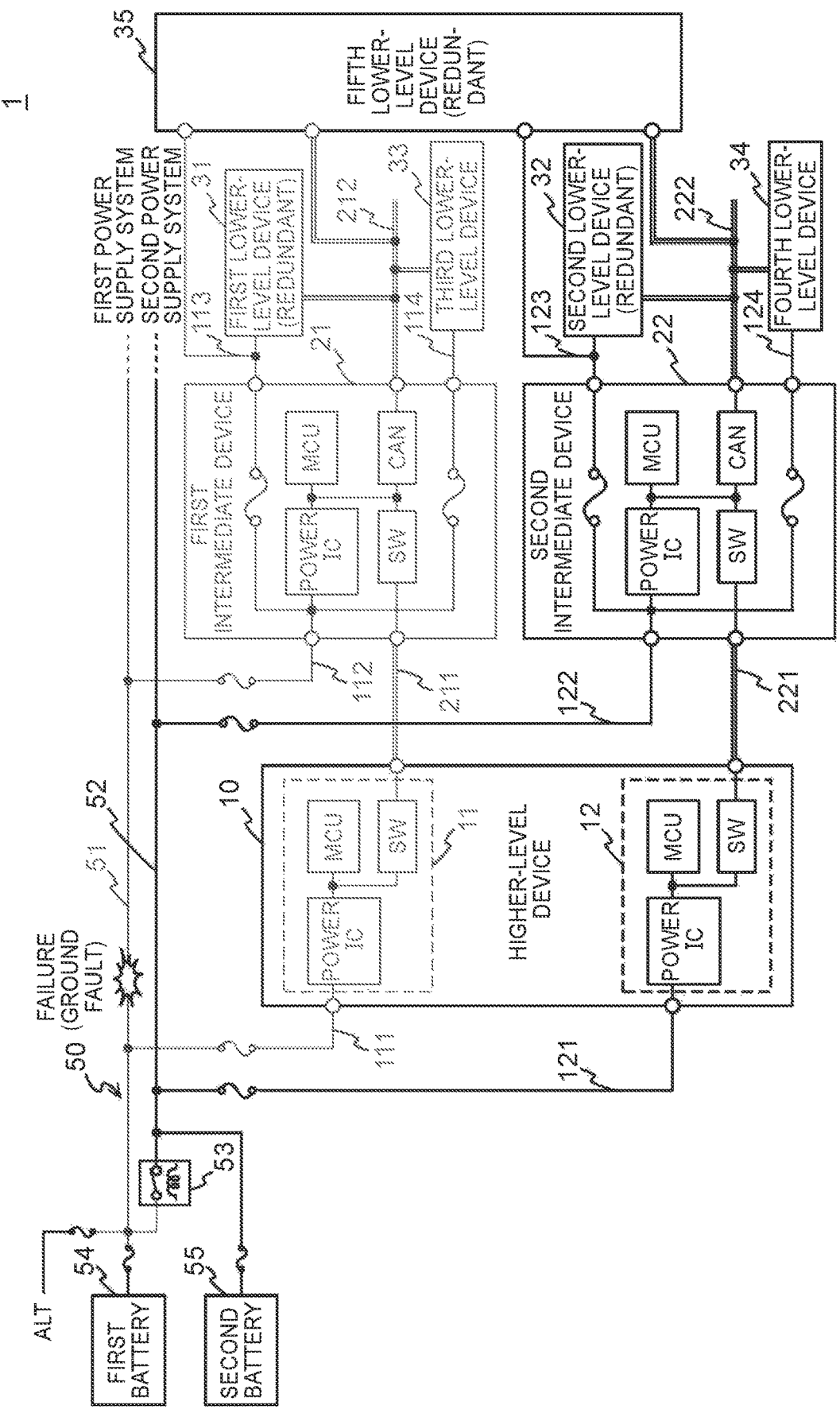
FIG. 2 is a view that shows a state of the network system in the case where a power supply of a first power supply system has failed.

Next, the state of the network system 1 according to the present embodiment when one of the power supply systems has failed will be described. FIG. 2 is a view that shows the state of the network system 1 in the case where the first power supply system 51 has a ground fault.

In this way, when the first power supply system 51 has a ground fault, the first channel communication unit 11 of the higher-level device 10, the first intermediate device 21, the first lower-level device 31, the third lower-level device 33, and a first power supply system input end of the fifth lower-level device 35 are not supplied with an electric power, with the result that the operations of the first channel communication unit 11, first intermediate device 21, first lower-level device 31, and third lower-level device 33 (first channel communication) stop (light narrow line portions in FIG. 2). On the other hand, the ground fault does not affect the second power supply system 52, so the second channel communication unit 12 of the higher-level device 10, the second intermediate device 22, the second lower-level device 32, the fourth lower-level device 34, and a second power supply system input end of the fifth lower-level device 35 are continuously supplied with an electric power, and the operations of these (second channel communication) are maintained (dark continuous line portions in FIG. 2).

Operation and Advantageous Effects

As described above, the network system 1 according to the embodiment of the invention includes the electric power system that includes the two power supply systems as redundant systems, provides the two redundant lower-level devices under each of the two intermediate devices that are supplied with an electric power from the different power supply systems, and is configured to supply each of the lower-level devices with an electric power from the same power supply system as the connected intermediate device.

With this configuration, even when one of the power supply systems fails, the operations of any one set of the redundant components can be maintained by using an electric power through the other one of the power supply systems, so the functions required for fail operation can be exercised.

When the configuration that the power supply system for the plurality of intermediate devices is divided into two, redundant components can be easily provided without a complex configuration even when the number of lower-level devices that require redundancy increases. As for a single lower-level device that requires redundancy as well, when the lower-level device is configured to be able to receive an electric power from each of the intermediate devices that use the different power supply systems, the functions required for fail operation when there is an abnormality, such as a failure in any one of the power supply systems, can be exercised.

The lower-level devices each are supplied with an electric power not directly from a trunk line of the associated power supply system. The lower-level devices each are supplied with an electric power from the associated intermediate device connected to that device. Thus, design flexibility of wire harness (W/H) increases, so W/H suitable for each individual vehicle can be optimally designed.

All of the higher-level device, intermediate device and lower-level devices that perform first channel communication are connected to one of the power supply systems, and all of the higher-level device, intermediate device, and lower-level devices that perform second channel communication are connected to the other one of the power supply systems. Therefore, even when one channel communication interrupts because of a failure of one of the power supply systems, communication from the higher-level device to the lower-level devices via the intermediate device through the other channel communication does not interrupt. Hence, an exclusive communication line need not be connected to control the higher-level device and the lower-level devices as measures against a power supply system failure, so a higher-level device need not be designed individually for each vehicle model.

Modification

Figure 3:
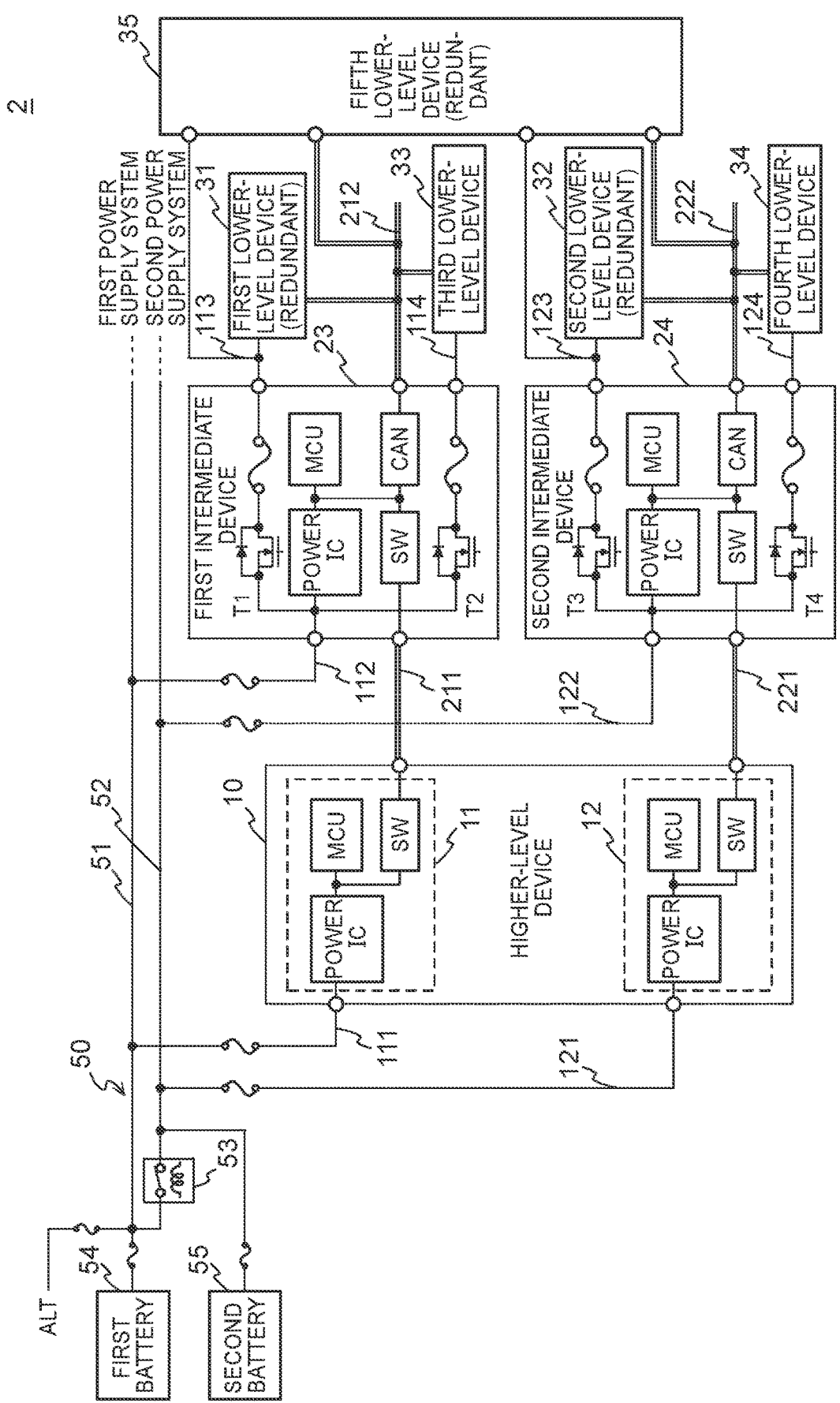
FIG. 3 is a schematic diagram of a network system according to a modification of the embodiment.

FIG. 3 is a schematic diagram of a network system 2 according to a modification of the present embodiment. The network system 2 according to the modification has such a configuration that the first intermediate device 21 and the second intermediate device 22 of the network system 1 according to the above-described present embodiment are respectively replaced with a first intermediate device 23 and a second intermediate device 24.

The first intermediate device 23 differs from the first intermediate device 21 in that a device T1 is provided between the power supply line 112 connected to the first power supply system 51 and the power supply line 113 connected to the first lower-level device 31 and the fifth lower-level device 35 and a device T2 is provided between the power supply line 112 connected to the first power supply system 51 and the power supply line 114 connected to the third lower-level device 33.

The second intermediate device 24 differs from the second intermediate device 22 in that a device T3 is provided between the power supply line 122 connected to the second power supply system 52 and the power supply line 123 connected to the second lower-level device 32 and the fifth lower-level device 35 and a device T4 is provided between the power supply line 122 connected to the second power supply system 52 and the power supply line 124 connected to the fourth lower-level device 34.

Each of the devices T1, T2, T3, T4 is a switching device that is able to switch the status of conduction or interruption based on an instruction from the higher-level device 10 or a control apparatus (not shown). For example, semiconductor elements, such as field effect transistors (MOSFETs), may be used as the devices T1, T2, T3, T4. When MOSFETs are used, two serially-connected transistors with opposite rectification directions of body diodes each formed between the source and the drain may be used as the devices T1, T2, T3, T4.

The devices T1, T2, T3, T4 are normally controlled to a conductive state, the first lower-level device 31, the third lower-level device 33, and the fifth lower-level device 35 are supplied with the electric power of the first power supply system 51 from the first intermediate device 21, and the second lower-level device 32, the fourth lower-level device 34, and the fifth lower-level device 35 are supplied with the electric power of the second power supply system 52 from the second intermediate device 22. The devices T1, T2, T3, T4 are controlled to an interrupted state in a predetermined situation.

For example, when the power supply of the first power supply system 51 fails as shown in FIG. 2, the second lower-level device 32 and the fifth lower-level device 35 execute fail operation; however, the process of the fourth lower-level device 34 can be unnecessary during the fail operation. In this case, when the fourth lower-level device 34 executes the process even during the fail operation, the electric power of the second battery 55 is consumed uselessly. For this reason, the network system 2 according to the modification controls the device T3 to a conductive state and controls the device T4 to an interrupted state in such a situation.

In this way, since the network system 2 according to the modification uses the devices T1, T2, T3, T4 as intermediate devices, electric power consumption is reduced while fail operation is safely executed. Since electric power consumption is reduced, it is expected to avoid design change or cost increase for increasing the capacities of the batteries.

The devices T1, T2, T3, T4 also have the function of a fuse, so part or all of fuses incorporated in the first intermediate device 21 and the second intermediate device 22 shown in FIG. 3 can be omitted.

Application Example

An application example in which the configuration using the devices T1, T2, T3, T4 shown in the modification is applied to a network system including an electric power system with no redundant power supply system will be described.

Figure 4:
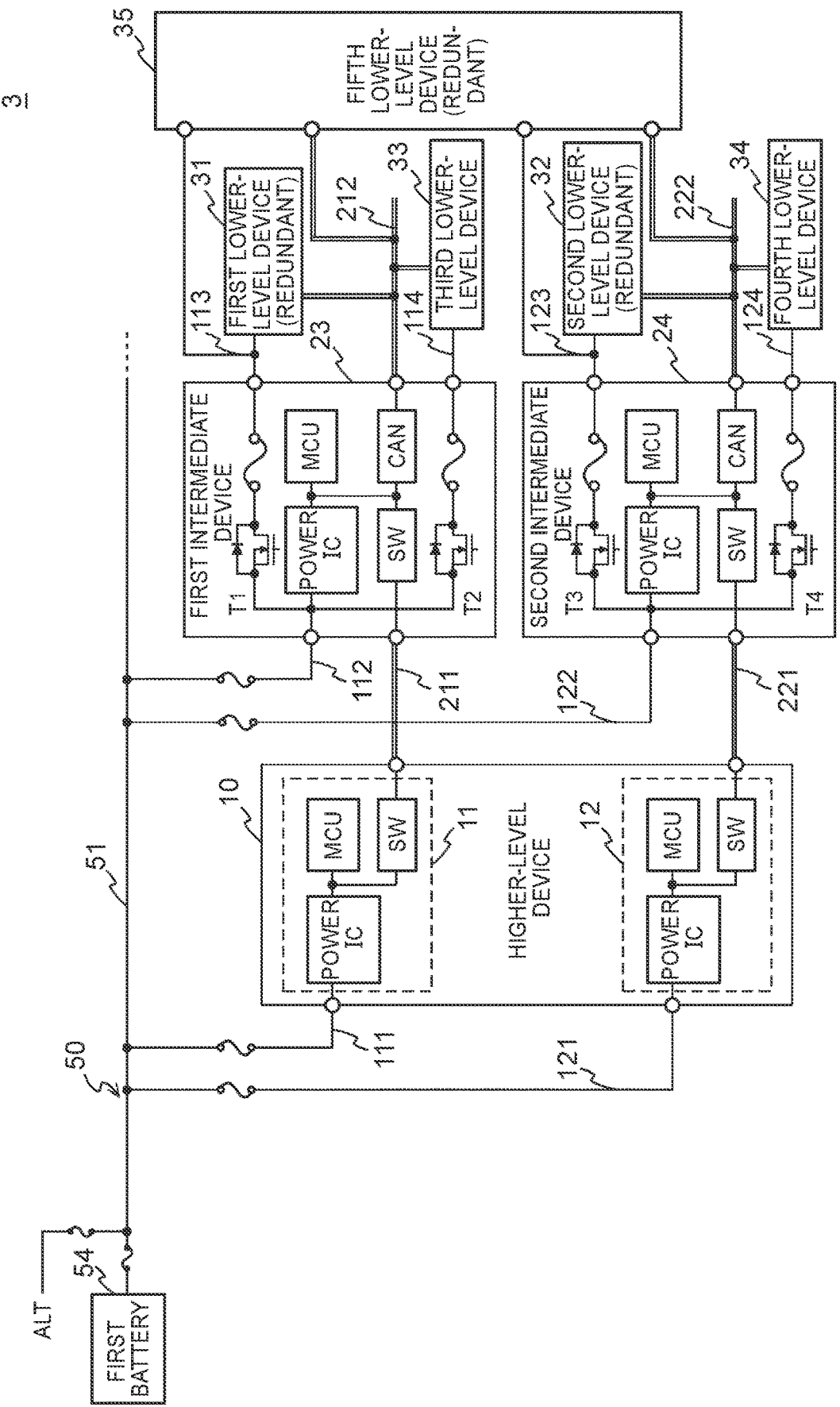
FIG. 4 is a schematic diagram of a network system according to an application example of the embodiment.

FIG. 4 is a schematic diagram of a network system 3 according to the application example. The network system 3 in the application example includes only the power supply system 51 as the electric power system 50. The power supply system 51 is supplied with an electric power from the first battery 54 serving as a power supply. Therefore, all of the higher-level device, intermediate devices, and lower-level devices are supplied with an electric power from the power supply system 51.

With the network system 3 according to the application example, when the power supply of the power supply system 51 fails, fail operation with the lower-level devices that require redundancy cannot be implemented, but electric power consumption is reduced.

For example, when the first lower-level device 31 and the second lower-level device 32 are redundant components required during autonomous driving, the second lower-level device 32 is deactivated by controlling the device T3 to an interrupted state during travel of the vehicle through manual driving for which a driver is authorized. Thus, during normal manual driving where there is no abnormality in the power supply system, an electric power that is consumed unnecessarily in the second lower-level device 32 is reduced.

The thus configured network system 3 may be expressed as "a network system that includes a higher-level device, a first intermediate device communicably connected to the higher-level device and configured to control supply of an electric power to a first lower-level device via a first device that can be controlled to interrupt, and a second intermediate device communicably connected to the higher-level device and configured to control supply of an electric power to a second lower-level device, which is a redundant component for the first lower-level device, via a second device that can be controlled to interrupt".

The embodiment of the invention is described above; however, the invention is not limited to the network system and may be regarded as an in-vehicle device, such as a device included in the network system, a control method or control program that an in-vehicle device including a processor and a memory executes, a control program, a non-transitory computer-readable storage medium storing the control program, a vehicle including the network system, or the like. The invention may also be applied to a network system other than a network system installed in a vehicle.

The invention is useful in a network system installed in a vehicle, or the like.

What is claimed is:

1. A network system comprising:
an electric power system including a first power supply system and a second power supply system as redundant systems;
a higher-level device connected to a first power supply of the first power supply system and a second power supply of the second power supply system;
a first intermediate device connected to the higher-level device so as to communicate with the higher-level device, the first intermediate device being connected to the first power supply of the first power supply system, the first intermediate device being configured to control supply of an electric power to a first lower-level device; and
a second intermediate device connected to the higher-level device so as to communicate with the higher-level device, the second intermediate device being connected to the second power supply of the second power supply system, the second intermediate device being configured to control supply of an electric power to a second lower-level device that is a redundant component for the first lower-level device,
wherein the first power supply and the second power supply are independent in connections from one another.

2. The network system according to claim 1, wherein:
the first intermediate device is configured to supply an electric power to a plurality of third lower-level devices including the first lower-level device via a first device configured to execute interruption control;
the second intermediate device is configured to supply an electric power to a plurality of fourth lower-level devices including the second lower-level device via a second device configured to execute interruption control; and
the higher-level device is configured to:
when the first power supply system fails, stop supply of an electric power to at least one of the plurality of fourth lower-level devices by controlling the second device, the at least one of the fourth lower-level devices being unnecessary to operate; and
when the second power supply system fails, stop supply of an electric power to at least one of the plurality of third lower-level devices by controlling the first device, the at least one of the third lower-level devices being unnecessary to operate.

\* \* \* \* \*